United States Patent Office 3,041,313
Patented June 26, 1962

3,041,313
POLYSPIRANE RESINS COMPOSITION
Edward Lavin, Longmeadow, and Saul Cohen, Springfield, Mass., assignors to Shawinigan Resins Corporation, Springfield, Mass., a corporation of Massachusetts
No Drawing. Filed Apr. 16, 1958, Ser. No. 728,791
8 Claims. (Cl. 260—67)

This invention pertains to an organic resin composition. More specifically it pertains to a novel organic material comprising a modified polyspirane composition which is particularly suitable for electrical conductor insulation, the method of manufacture of such conductor insulation, and the use of such conductors having this insulation material thereon.

It has been well known in the art to apply resinous coatings to electrical conductors for the purpose of electrically insulating such conductor from its surroundings. Both organic and inorganic coating materials have been used depending upon such factors as temperature service, particular atmospheric exposure and the mechanical manipulations which the coated wire must withstand either in the fabrication of the electrical device or its subsequent service. The particular physical and chemical properties which the insulation in the present application possesses are substantially superior heat stability, heat shock, cut thru, solvent resistance, and low water pick up. Such a combination of improved properties in an insulation is certainly surprising as well as desirable.

The primary object of this invention is the provision of an organic resin composition particularly suitable for wire enamel coatings having suitable utility both at high and low temperatures. Another object of this invention is to provide a resinous film, which at high temperatures, maintains its characteristics of being continuous, hard, flexible, abrasion resistant and solvent resistant.

The objects of this invention can be accomplished by using as the resin composition a polyspirane resin modified with isocyanate materials as crosslinking agents. The particular polyspirane resin that is acceptable in the practice of this invention can be represented by the following general formula:

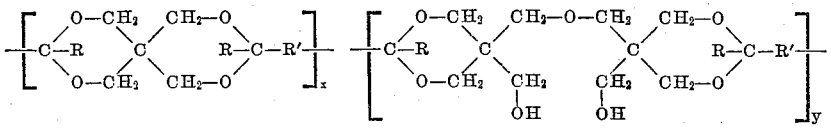

where R is taken from the group consisting of hydrogen and methyl groups, R' is taken from the group consisting of aliphatic hydrocarbons defined by $(CH_2)_s$, where $s$ is an integer from 0-8 and alicyclic and aromatic hydrocarbons of 5 to 6 carbon atoms and derivatives thereof, $x$ plus $y$ is equal to an integer from 2–100 and $y$ is an integer equal to no more than 50% of $x$ plus $y$. The acceptable molecular weight range for the polyspiranes in this invention is 400–20,000.

The isocyanate materials that are usable in this invention are polyisocyanates and derivatives thereof. The suitable polyisocyanates can be identified by the following general formula $$R''(N=C=O)_z$$

where R'' is taken from the group of aliphatic hydrocarbons of 2 to 8 carbon atoms and cyclic hydrocarbons of 5 to 6 carbon atoms and alkyl-aryl substitutes thereof, and $z$ is an integer from 2 to 4. Dimers and trimers of the polyisocyanates are usable in this invention. Isomers and mixtures of the polyisocyanates are also suitable as crosslinking agents for the polyspirane resins described heretofore.

The derivatives of the above polyisocyanates which are also usable in this invention are polyisocyanates having had some or all of the isocyanate groups reacted with compounds containing an active hydrogen atom. The suitable polyisocyanate derivatives can be identified by the following general formula

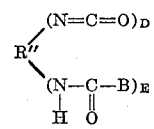

where R'' is the same as defined in the general formula for the polyisocyanates, B is the residual group of a compound having a reactive hydrogen atom, the reactive hydrogen atom adding at the nitrogen atom, D is an integer from 0 to 3, E is an integer from 1 to 4, and $D+E$ is an integer equal to no more than 4. B may be a polyfunctional compound in that it may contain more than one reactive hydrogen atom and thereby unite with more than a single polyisocyanate. The derivatives of the polyisocyanates may also be dimers and trimers, a typical illustration of the trimer being shown in the following general formula:

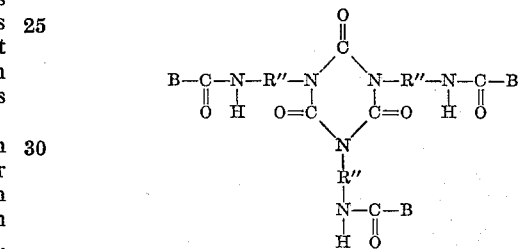

The invention is practiced in its specific embodiment as illustrated in the following examples but is not limited thereto:

EXAMPLE 1

*Preparation of Poly(Glutardiylidene Pentaerythritol) Resin*

480 gms. of technical pentaerythritol, which is a mixture of 88 parts by weight of the mixture of monopentaerythritol and 12 parts of dipentaerythritol is charged to a 5 liter flask equipped with a reflux column along with 1384 gms. of a 24% by weight solution of glutaraldehyde in distilled water, and an additional 1200 gms. of distilled water. The mixture is heated to reflux and the contents stirred by which time the technical pentaerythritol has all dissolved. The catalyst, 7.4 gms. of oxalic acid, a water soluble organic acid is added to the boiling solution. Within a period of five minutes after the addition of the acid catalyst, insoluble resin particles have already formed. The reaction is substantially completed within two hours. The resin is then filtered, washed with water until neutral and dried. The resin is a white powder with a melting point of at least 200° C.

*Preparation of the Wire Enamel*

For the preparation of a wire enamel the following procedure is used: into a 2-liter round-bottomed flask equipped with a stainless steel condenser and motor-driven stirrer is placed 488 ml. of cresylic acid and 155 ml. of naphtha solvents. To the solvent mixture is added 150 gms. of poly(glutardiylidene pentaerythritol). The contents then are stirred, heated to 50–100° C. and held in that temperature range for approx. 1–5 minutes, at which time the heating and stirring are discontinued. The hot resin solution is then filtered through a Büchner funnel lined with felt and the cooling filtrate allowed to drain into the final enamel container.

A 50% by weight solution of 37.4 gms. of the phenol adduct of the reaction product between 1 mol. of trimethylolpropane and 3 mols of tolylene diisocyanate in equal weight proportions of cresylic acid and naphtha and is added to the cooling resin solution with some stirring.

EXAMPLE 2

The same procedure is followed as described in Example 1 except that in substitution for the particular polyisocyanate derivative used, 31.8 gms. of the trimer of the phenol adduct of 3 mols of tolylene diisocyanate, is used and 3 gms. of salt-free poly(tetrafluoroethylene) in the form of a 65% by weight colloidal aqueous dispersion is added to the cooling resin batch after the polyisocyanate addition. The poly(tetrafluoroethylene) is added while stirring the enamel batch.

EXAMPLE 3

The same procedure is followed as described in Example 1 except that in substitution for the polyspirane resin prepared in the manner heretofore described, 150 gms. of poly(glutardiylidene pentaerythritol) prepared with a nonionic emulsifier is used.

The preparation of the poly(glutardiylidene pentaerythritol) used in the present example is as follows:

294 gms. of glutaraldehyde is reacted with 423 gms. of a mixture of pentaerythritols, the mixture containing 88% by weight of the mixture of monopentaerythritol and 12% of dipentaerythritol. The glutaraldehyde and pentaerythritol mixture is added to 2040 ml. of distilled water and the contents heated to reflux in the presence of 35.9 gms. of a nonionic emulsifier, consisting of a copolymer of ethylene oxide and propylene oxide.

12.2 gms. of hydrogen lauryl sulfate catalyst is added to initiate the reaction after reflux is achieved. The resin is then filtered, washed with water until neutralized and dried. The resin is a white powder with a melting point of at least 250° C. The quantitative analysis for the carbon hydrogen and oxygen content of the compound yielded 58.4%, 8.2% and 33.4% respectively which is in close agreement with the theoretical values for the compound.

EXAMPLE 4

The same procedure is followed as described in Example 1 except that in substitution for the polyspirane resins prepared in the manner heretofore described, 150 gms. of poly(malondiylidene pentaerythritol) prepared in the following manner is used:

Into a 5-liter, 3 necked round-bottom flask equipped with a motor-driven stirrer, dropping funnel and still head, thermometer and connecting condenser, 169 gms. of pentaerythritol is added, followed by 932 gms. of dry benzene. Next 256 gms. of the triethyl, monomethyl diacetal of malonaldehyde is added to the mixture followed by 4.2 gm. of p-toluenesulfonic acid. The reaction mixture is heated in a water bath maintained at 80–85° C. for approximately 2 hours until substantially all of the alcohol-benzene azeotrope with a boiling range of 55–72° C. has been distilled off. At this time 1745 gms. of cresylic acid is added to the reaction mixture along with a further 8.4 gms. of p-toluenesulfonic acid. The reaction mixture is then stirred at 80–90° C. until substantially all of the benzene and alcohol remaining in the reaction mixture are distilled off. A slight vacuum will aid the distillation. The reaction mixture is then cooled, neutralized, diluted with 4 liters of water, and filtered for the isolation of the resin product. The resin after drying is a cream colored powder with a melting point of at least 300° C.

EXAMPLE 5

The same procedure is followed as described in Example 1 except that in substitution for the particular polyisocyanate derivative used, 10.5 gms. of tolylene diisocyanate or its isomers, or mixtures thereof is used.

EXAMPLE 6

The same procedure is followed as described in Example 1 except that in substitution for the particular polyisocyanate derivative used, 21.6 gms. of the phenol adduct of tolylene diisocyanate or its isomers or mixtures thereof is used.

EXAMPLE 7

The same procedure is followed as described in Example 1 except that in substitution for the particular polyisocyanate derivative used, 14.5 gms. of the phenol adduct of triphenylmethane triisocyanate is added and in substitution for the poly(glutardiylidene pentaerythritol) is substituted 150 gms. of poly(3-methylglutardiylidene pentaerythritol).

EXAMPLE 8

The same procedure is followed as described in Example 1 except that in substitution for the polyisocyanate derivative used, 21.4 gms. of the phenol adduct of hexamethylene diisocyanate is added.

EXAMPLE 9

The same procedure is followed as described in Example 1, except that in substitution for the poly(glutardiylidene pentaerythritol), 150 gms. of poly(terephthaldiylidene pentaerythritol) prepared in the following manner is used:

Into a 3-liter, 3 necked round-bottom flask equipped with a reflux column is charged 158 gms. of pentaerythritol along with 780 gms. of a 20% by wt. solution of terephthalic aldehyde in hot water and an additional 600 gms. of water. The mixture is heated to reflux and the contents stirred by which time the pentaerythritol has all dissolved. The catalyst, 2.7 gms. of phosphoric acid, a water soluble inorganic acid, is added to the boiling solution. The reaction is substantially completed within 2 hours. The resin is then filtered, washed with water until neutralized and dried. The resin is a white powder with a melting point of at least 300° C.

EXAMPLE 10

The same procedure is followed as described in Example 1 except that in substitution for the poly(glutardiylidene pentaerythritol) 150 gms. of poly(succindiylidene pentaerythritol) prepared in the following manner is used:

Into a 3-liter, 3 necked, round-bottomed flask equipped with a reflux column is charged 157 gms. of pentaerythritol along with 495 gms. of a 20% solution by weight of succinaldehyde in water and an additional 500 gms. of water. The mixture is heated to reflux and the contents stirred by which time the pentaerythritol has dissolved. The catalyst, 0.8 gm. of formic acid, a water soluble organic acid, is added to the boiling solution. The reaction is substantially completed within 2 hours. The resin is then filtered, washed with water until neutralized and dried. The resin is a white powder with a melting point of at least 240° C.

EXAMPLE 11

The same procedure is followed as described in Example 1 except that in substitution for the poly(glutardiylidene pentaerythritol), 150 gms. of the copolymer product of equimolar portions of glutaraldehyde and 3-methylglutaraldehyde and the pentaerythritol mixture is used and in substitution for the 488 ml. of cresylic acid and 155 ml. of naphtha is used 214 ml. and 429 ml. respectively in the preparation of the wire enamel.

Other polyspiranes are suitable for the practice of this invention than those specifically shown in the examples and whose formulations will be obvious to the man skilled in the art after the following discussion. The dialdehyde component of the resin although shown mostly as an unsubstituted aliphatic dialdehyde can also be selected from the group of (a) succinaldehyde, glutaraldehyde, suberic dialdehyde, azeleic dialdehyde, sebacic dialdehyde, and mixtures thereof, (b) cyclopentanedial, cyclohexanedial, phthalic aldehydes and mixtures thereof, (c) mixtures of (a) and (b), (d) methyl and ethyl diacetals of malonaldehyde, succinaldehyde and glutaraldehyde, methyl and ethyl diketals of 2,4-pentanedione, 2,5-hexanedione and 2,6 heptanedione, and mixtures thereof and (e) methyl and ethyl substituted products of (a) and (d). The pentaethythritol component of the polyspirane condensation product can be (a) pentaerythritol, or (b) a material taken from the group consisting of pentaerythritol and mixtures of pentaerythritol with dipentaerythritol containing up to 50% dipentaerythritol by weight of the mixture. Acid catalysts suitable for the polyspirane reaction can be either inorganic acids such as hydrochloric, sulfuric and phosphoric acids or organic types such as oxalic, p-toluenesulfonic or formic acids. The acid concentration is not critical during the polymerization reaction. The preferred concentration of the polyspirane resin is 50–96% by weight of the solid resinous insulation.

Other isocyanate materials are also suitable for the practice of this invention as substitutes for those listed in the preceding examples. As further illustrative of those which are satisfactory for use, such can be limited generally to those having two or more isocyanate groups either none or all of which reactive groups being blocked or hindered from immediate reaction by a previous reaction with a compound containing an active hydrogen atom. The polyisocyanates which are suitable for this invention can be further characterized as those which after crosslinking have stability at the temperature service of the wire for indefinite periods. These isocyanates can also be dimers and trimers of the simple di- or tri-isocyanates since this is a common characteristic of these materials. Such are readily formed merely under the influence of heat or by the presence of such substances as iron peroxides, phenolates, pyridine, calcium carbonate, triethylamine, oxalic acid, Grignard reagents or triethylphosphine. The aromatic polyisocyanates more generally form the trimers while the aliphatic polyisocyanates are more prone to form the dimers. The polyisocyanates can be prepared by many known procedures. A well known continuous process reacts phosgene with the particular amine or its salt of the isocyanate desired. Suitable polyisocyanates include compounds such as phenylene diisocyanates, tolylene diisocyanates, naphthalene diisocyanates, diphenylmethane diisocyanates, cyclohexanediol diisocyanates, ethylene diisocyanate, tetramethylene diisocyanates, hexamethylene diisocyanates, methylbenzene triisocyanates, polyisocyanates which are the partial reaction products of diisocyanates or triisocyanates with polyhydric alcohols, and the like, and mixtures thereof. The preferred concentration of the polyisocyanate is 4–50% by weight of the solid resinous insulation.

The polyisocyanate derivatives useful in this invention include materials which on heating from 100–250° C. yield a polyisocyanate. These materials are also known as blocked, hidden or disguised polyisocyanates and many are available commercially. The procedure of blocking is one well known in the art so that no further discussion of the mechanism need be given. Suitable reactive hydrogen containing materials combining with the polyisocyanates to form the blocked derivative thereof include phenols such as phenol, cresol, xylenols, etc., secondary aromatic amines, tertiary alcohols (mono and poly-functional), amides, lactams, mercaptans and the like.

Still other forms of polyisocyanates are utilizable in the practice of this invention. Stearically hindered diisocyanates, according to either the teachings of U.S.P. 2,723,265 and U.S.P. 2,729,666 may be used as the crosslinking agents for the polyspirane component of the resin product.

The use of blocked polyisocyanates increases the storage life of a prepared wire enamel. A further distinction between the blocked polisocyanates, as crosslinking agents for the polyspirane resins as contrasted to unblocked polyisocyanates in this same use is that the latter are more prone to crosslink at low temperatures. Where it is desirable to prevent crosslinking at low temperatures the blocked isocyanate is preferable. Therefore in the present application where the polyisocyanate has been added to a heated solution of the polyspirane resin, such addition should take place at temperatures below 40° C. if the unblocked polyisocyanate is used. Crosslinked enamel formulations generally yield films having bumps therein.

Both ionic and nonionic emulsifiers are suitable for the preparation of the polyspirane resin. The purpose of the emulsifier in the resin preparation is to increase the molecular weight of the resin by keeping it in contact with the reaction medium for a longer period of time than would ordinarily occur due to the general insolubility of the resin in aqueous systems.

The naphtha solvent used in the preparation of the wire enamels is liquid hydrocarbon of boiling range 150–184° C., derived from coal tar and petroleum. Other solvents which are suitable as diluents for the cresylic acid in the preparation of the wire enamels in this application are substituted and unsubstituted aromatic liquid hydrocarbons such as chlorobenzene, toluene, and cumene, and such other solvents as furfuryl alcohol and furfural. The acceptable total solids range for wire enamels in this invention is 5 to 40 weight percent total solids.

The cresylic acid that is useful in the wire enamel preparation is a liquid phenolic compound consisting primarily of xylenols and cresols and having a boiling range of 195–227° C.

The poly(tetrafluoroethylene) used in Example 2 is commercially available. Suitable substitutes for this material in the practice of the invention are the polymers of ethylene and the halogenated derivatives thereof. The presence of 1–5% by weight of these additives in the solid resinous product improves the abrasion resistance of films made therefrom.

The curing temperature for a polyspirane-isocyanate reaction product not containing solvents or other additives is limited only to that temperature at which the isocyanate material will crosslink. This temperature will therefore depend upon the chemical reactivity of the particular isocyanate material as well as upon whether the blocked or unblocked material is employed. Temperatures as low as 40° C. will cure such a system containing an unblocked polyisocyanate. Temperatures as low as 100° C. will cure a like system containing the blocked isocyanate.

The systems used in the preceding examples impose other limitations upon the curing temperature of the final resin product dependent upon such factors as the relative volatility of the particular solvent used and the stability of any other particular additive. Such other commercial factors as the type curing equipment to be used and the desired time to complete the cure reaction will also influence the curing temperature selected. For the compositions in the preceding examples a standard commercial type wire enamel tower was utilized, wherein operating temperatures of 300° to 400° C. were employed.

The wire enamel prepared in Example 1 was applied to No. 18 heavy magnet wire and subjected to the standard tests of acceptance for this application. The wire enamel was applied to the wire and cured with heat by conventional means.

The data in Table I represents the comparative results of mechanical and thermal properties tests between the polyspirane-isocyanate coating and coatings of polyvinyl formal-phenolic resin applied to the same size wire.

TABLE I

| Sample (on a 2.8 mil build) | Heat Shock Test at 160° C. | Cut-Thru Temp. (° C.) | Flex Life at 150° C. (Hours) | Jerk Test |
|---|---|---|---|---|
| Polyspirane-isocyanate | P [1] | 210 | 280 | P |
| Polyvinyl formal-phenolic | P | 205 | 60 | P |

[1] "P" indicates that the sample passed the particular test.

The heat shock test is made by a modified ASA (American Standards Assn.) procedure whereby the enameled wire is tested for cracks at an elevated temperature after having been stressed by wrapping around a circular mandrel. The cut-thru temperature is an AIEE (American Institute of Electrical Engineers) test for thermoplastic flow whereby the coated wire is mechanically loaded while the ambient temperature is raised until electrical contact is made with the metallic wire substrate. The flex life is another modified ASA test whereby the embrittlement characteristics of the coating is measured after exposure to elevated temperatures by wrapping around a circular mandrel. The jerk test is an ASA test for adherence of the coating to the metal wire after the coated sample has been mechanically elongated. It can be observed from the data in Table I that the polyspirane-isocyanate resin performance was superior or equal to the polyvinyl formal-phenolic resin in all properties tested.

Table II is a comparative compilation of the electrical properties and chemical stability of the same wire coatings as tested in Table 1. The kv.-life tests were made in accordance with the provisions of the A.I.E.E. specifications No. 57, dated October 1955 and the test is a measure of the period for which a coating can be exposed at the particular temperature indicated before it will fail as electrical insulation upon the application of 2000 volts to the sample. The ethanol-toluene boil test is a modified ASA procedure which subjects a sample to mechanical stress to measure the removability of the coating after a 10 min. immersion in an equivolume boiling solution of ethanol and toluene. The methanol extractibles and toluene extractibles tests are a measure of the weight percent of the film removed after a two hour period in the respective boiling liquids. The Freon 22 blisters/inch test is a visual count of the blisters formed after a 16 hour immersion in the liquified gas, which is a commercially available chlorinated hydrocarbon refrigerant. The Freon 22 extractibles test is a measure of the weight percent of the film removed after a 16 hour immersion in the liquified gas. The remaining chemical tests shown in Table III are all measures of the abrasion resistance of the coatings after a 24-hour immersion in the indicated solvents.

TABLE III

Abrasion Resistance After 24-Hour Immersion in Following Solvents

| Sample (on a 2.8 mil build) | Toluene | ETOH | $H_2S_4O$ | KOH | $H_2O$ |
|---|---|---|---|---|---|
| Polyspirane-isocyanate | P [1] | P | P | P | P |
| Polyvinyl formalphenolic | P | P | P | P | P |

[1] "P" indicates that the sample passed the particular test.

It is to be understood that this invention is not limited to the particular wire coating or wire size described above. It is obvious from the above tests results that a wire coated with the polyspirane-isocyanate enamel alone will be acceptable as 130° C. (B) service wire. But it is also obvious to a man skilled in the art to modify the application of the enamel so as to upgrade its high temperature usefulness by means of known practices in the field. It is possible for instance to utilize the present coating as an undercoat on a wire and to apply as an overcoat one or more of the many compatible insulating varnishes and thereby obtain a coating acceptable as a class 155° C. (F) or higher insulation. It is also not intended to limit the application of the resin as an electrical insulation for wire merely. It is possible by means of extrusion, casting and other known means to form insulation from this material that is useful in such electrical applications as slot liners, encapsulation, sheet insulation, and surface coatings. The resin can also be used as an adhesive agent in the bonding of electrical parts that expect use at elevated temperatures. Further use can be made of the invention as insulation and/or impregnating varnishes for such articles as glass tapes and electrical coils. Other non-electrical uses of this resin are apparent where chemical resistance and temperature stability of the final product are needed, such as surface coatings and others.

In addition to the various applications for which this resin is particularly suitable as hereinbefore described, it will be ovious to the man skilled in the art that not only other applications are apparent but that other compositions and other processes for the manufacture of the compositions are likewise within the scope of this invention.

What is claimed is:

1. A crosslinked reaction product of
   (A) a polyspirane resin having the general formula

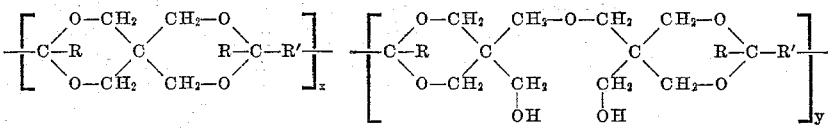

where R is taken from the group consisting of H and $CH_3$, R' is $(CH)_s$, where $s$ is an integer from 0–8, $x+y$ is equal to an integer from 2–100 and $y$ is an integer equal to no more than 50% of $x+y$ and
   (B) a polyisocyanate crosslinking agent, said polyspirane having a melting point of at least 200° C., a molecular weight of 400 to 20,000, and equalling 50% to 96% by weight of (A) plus (B).

TABLE II

| Sample (on a 2.8 mil build) | 2 kv.-Life °/C. (Hours) 200° | 2 kv.-Life °/C. (Hours) 160° | Dielectric Str. (volts/mil) Dry | ETOH-toluene Boil | MeOH Extrac., percent | Toluene Extrac., percent | Freon 22 Extrac., percent | Freon 22 (blisters/inch) |
|---|---|---|---|---|---|---|---|---|
| Polyspirane-isocyanate | 285 | 7,100 | 2,770 | P [1] | 0.3 | 1.4 | 0.45 | 0-1 |
| Polyvinyl formalphenolic | 110 | 820 | 3,050 | P | 2.9 | 4.8 | 0.75 | 2 |

[1] "P" indicates that the sample passed the particular test.

2. A product as in claim 1 wherein the polyspirane is poly(glutardiylidene pentaerythritol).

3. A product as in claim 1 wherein the polyspirane is poly(succindiylidene pentaerythritol).

4. A product as in claim 1 wherein the polyspirane is the copolymer of equimolar portions of glutaraldehyde and 3-methyl glutaraldehyde with a mixture of 88 parts by weight of monopentaerythritol and 12 parts of dipentaerythritol.

5. A product as in claim 1 wherein the polyisocyanate is tolylene diisocyanate.

6. A product as in claim 1 wherein the polyisocyanate is the phenol adduct of the reaction product of 1 mol trimethylol propane and 3 mols of tolylene diisocyanate.

7. A product as in claim 1 wherein the polyisocyanate is the phenol adduct of the trimer of tolylene diisocyanate.

8. A metal electrical conductor insulated with a coating comprising the product of claim 1.

References Cited in the file of this patent

UNITED STATES PATENTS

| | | |
|---|---|---|
| 2,643,236 | Kropa et al. | June 23, 1953 |
| 2,739,972 | Abbott et al. | Mar. 27, 1956 |
| 2,785,996 | Kress | Mar. 19, 1957 |

FOREIGN PATENTS

| | | |
|---|---|---|
| 838,827 | Germany | May 12, 1952 |